(12) United States Patent
Shah et al.

(10) Patent No.: US 12,355,821 B2
(45) Date of Patent: Jul. 8, 2025

(54) POLICY SELECTION SYSTEM

(71) Applicant: Ikigai Labs, Inc., San Francisco, CA (US)

(72) Inventors: Devavrat Dilitkumar Shah, Newton, MA (US); Nathaniel C. Lanier, Boston, MA (US); John N. Tsitsiklis, Lexington, MA (US)

(73) Assignee: Ikigai Labs, Inc., San Francisco, CA (US)

( * ) Notice: Subject to any disclaimer, the term of this patent is extended or adjusted under 35 U.S.C. 154(b) by 0 days.

(21) Appl. No.: 18/827,265

(22) Filed: Sep. 6, 2024

(65) Prior Publication Data
US 2025/0080586 A1    Mar. 6, 2025

Related U.S. Application Data

(60) Provisional application No. 63/580,780, filed on Sep. 6, 2023.

(51) Int. Cl.
*H04L 29/06*    (2006.01)
*H04L 9/40*    (2022.01)
(52) U.S. Cl.
CPC ..................... *H04L 63/20* (2013.01)

(58) Field of Classification Search
CPC ....... H04L 63/10; H04L 63/20; H04L 63/108; H04L 63/101; H04L 63/0263; H04L 63/0227
See application file for complete search history.

(56) References Cited

U.S. PATENT DOCUMENTS 11,637,864 B2 *    4/2023    Raff ................. H04L 41/40
726/2

\* cited by examiner

*Primary Examiner* — Longbit Chai
(74) *Attorney, Agent, or Firm* — Occhiuti & Rohlicek LLP

(57) ABSTRACT

A method for selecting a policy includes evaluating a number of metrics for a number of policies including generating, for each policy of a number of policies, values of the metrics, the generating including applying the policy to a system to generate the values, processing the values of the metrics for the number of policies to determine a boundary of combinations of metric values, combinations on the boundary representing a policy such that no other policy of the number of policies improves all the metric values, presenting, in a user interface, the boundary of combinations of metric values, receiving, at the user interface, a selection of one of the policies made based on the boundary, and providing configuration data associated with the selected policy for implementation in a deployed system.

15 Claims, 9 Drawing Sheets

| Day | Current State (Inv.) | Current State (Orders) | Hammer Sales | Future Predict. | Action (Hammers) | Inv. After Sales | Orders After Action | Inventory Value ($) | Missed Sales |
|---|---|---|---|---|---|---|---|---|---|
| 1 | 20 | [0,0,0] | 7 | [5, 4, 3, 7, 2] | 0 | 13 | [0,0,0] | 199.8 | 0 |
| 2 | 13 | [0,0,0] | 10 | [4, 3, 7, 2, 8] | 24 | 3 | [0,0,24] | 129.87 | 0 |
| 3 | 3 | [0,0,24] | 7 | [3, 7, 2, 8, 9] | 0 | 0 | [0,24,0] | 0 | 39.96 |
| 4 | 0 | [0,24,0] | 8 | [7, 2, 8, 9, 5] | 0 | 0 | [24,0,0] | 0 | 79.92 |

FIG. 3

```
Simulation Pseudocode
1  def run_simulation(environment, policy, dynamics, metrics, initial_state):
2      for time_step in time_steps:
3          current_environment = environment.query(time_step)
4          action = policy.apply_policy(current_state, current_environment)
5          next_state = dynamics.apply_dynamics(
6              current_state, current_environment, action
7          )
8          df_metrics = metrics.apply_metrics(
9              time_step, current_state, next_state, current_environment, action
10         )
11         current_state = next_state
12
13 environment = init_environment()
14 for policy_parameter in policy_parameters:
15     for dynamics_parameter in dynamics_parameters:
16         for simulation_parameters in simulation_parameters:
17             policy = init_policy(policy_parameters)
18             dynamics = init_dynamics(dynamics_parameters)
19             metrics = init_metrics(
20                 policy_parameters, dynamics_parameters, simulation_parameters
21             )
22             initial_state = init_state()
23             run_simulation(environment, policy, dynamics, metrics, initial_state)
```

FIG. 4

```
apply_policy() Pseudocode
1  for sku in skus:
2      # dont place an order if there is already an order in the queue
3      if sum(orders_in_queue) > 0:
4          new_order = 0
5      # if current_inventory < threshold - place order
6      elif current_inventory < sum(forecasts[:t]):
7          new_order = sum(forecasts[:T])
8      # else dont order anything
9      else:
10         new_order = 0
11
```

FIG. 6

POLICY SELECTION SYSTEM

CROSS-REFERENCES TO RELATED APPLICATIONS

This application claims the benefit of U.S. Provisional Application No. 63/580,780 filed Sep. 6, 2023, the entire contents of which are incorporated herein by reference.

BACKGROUND OF THE INVENTION

This application relates generally to computer-implemented methods and systems for automatically processing datasets to optimize policies.

Decision-making in complex systems often involves considering a broad array of variables, constraints, and uncertainties. These systems range from supply chain management and inventory replenishment to broader policy formulation in economics, healthcare, and environmental management. In such scenarios, the outcomes of decisions are highly dependent on a multitude of interacting factors, making it difficult to predict the effects of any given policy or action. Traditional decision-making tools in this area are often static or based on narrow assumptions, which limits their ability to adapt to changing conditions or account for uncertainties.

SUMMARY OF THE INVENTION

In a general aspect, a method for selecting a policy includes evaluating a number of metrics for a number of policies including generating, for each policy of a number of policies, values of the metrics, the generating including applying the policy to a system to generate the values, processing the values of the metrics for the number of policies to determine a boundary of combinations of metric values, combinations on the boundary representing a policy such that no other policy of the number of policies improves all the metric values, presenting, in a user interface, the boundary of combinations of metric values, receiving, at the user interface, a selection of one of the policies made based on the boundary, and providing configuration data associated with the selected policy for implementation in a deployed system.

Aspects may include one or more of the following features.

The method may include presenting, in the user interface, combinations of metric values for each policy of the number of policies. Generating the values of the metrics may be based at least in part on a history of operation of the system. Generating the values of the metrics may include simulating the application of the number of policies to the system based on the history of operation of the system. Generating the values of the metrics may be based at least in part on the history of operation of the system includes using the history to predict future operation of the system.

The boundary of combinations may be a Pareto boundary. Each policy of the number of policies may be a decision-making policy. The boundary may be presented as a curve in a cartesian coordinate system. The boundary may be presented as a surface in a three-dimensional coordinate system. Each policy of the pluralities of policies may include a mapping of states of the system to actions to be taken by the system. Evaluating the number of metrics for the number of policies may include determining a set of actions to be taken by the system for each policy of the number of policies.

The values of the metrics for the policies may be based at least in part on the set of actions associated with the policies. The method may include receiving an indication from the deployed system that the values of the metrics associated with the selected policy have changed and a new policy should be selected.

In another general aspect, a system for selecting a policy includes one or more processors configured to evaluate a number of metrics for a number of policies including generating, for each policy of a number of policies, values of the metrics, the generating including applying the policy to a system to generate the values, and process the values of the metrics for the number of policies to determine a boundary of combinations of metric values, combinations on the boundary representing a policy such that no other policy of the number of policies improves all the metric values. The system also includes a user interface configured to present the boundary of combinations of metric values and receive a selection of one of the policies made based on the boundary. The system also includes an output for providing configuration data associated with the selected policy for implementation in a deployed system.

In another general aspect, software stored on a non-transitory, computer-readable medium and includes instructions for causing a computing system to implement a method for selecting a policy. The instructions cause the computing system to evaluate a number of metrics for a number of policies including generating, for each policy of a number of policies, values of the metrics, the generating including applying the policy to a system to generate the values, process the values of the metrics for the number of policies to determine a boundary of combinations of metric values, combinations on the boundary representing a policy such that no other policy of the number of policies improves all the metric values, present, in a user interface, the boundary of combinations of metric values, receive, at the user interface, a selection of one of the policies made based on the boundary, and provide configuration data associated with the selected policy for implementation in a deployed system.

Other features and advantages of the invention are apparent from the following description, and from the claims.

BRIEF DESCRIPTION OF THE DRAWINGS

FIG. 3 is a table illustrating the results of simulating a policy.

FIG. 4 is pseudocode for simulation of policies.

FIG. 6 is pseudocode for applying a policy to data.

DETAILED DESCRIPTION

Figure 1:
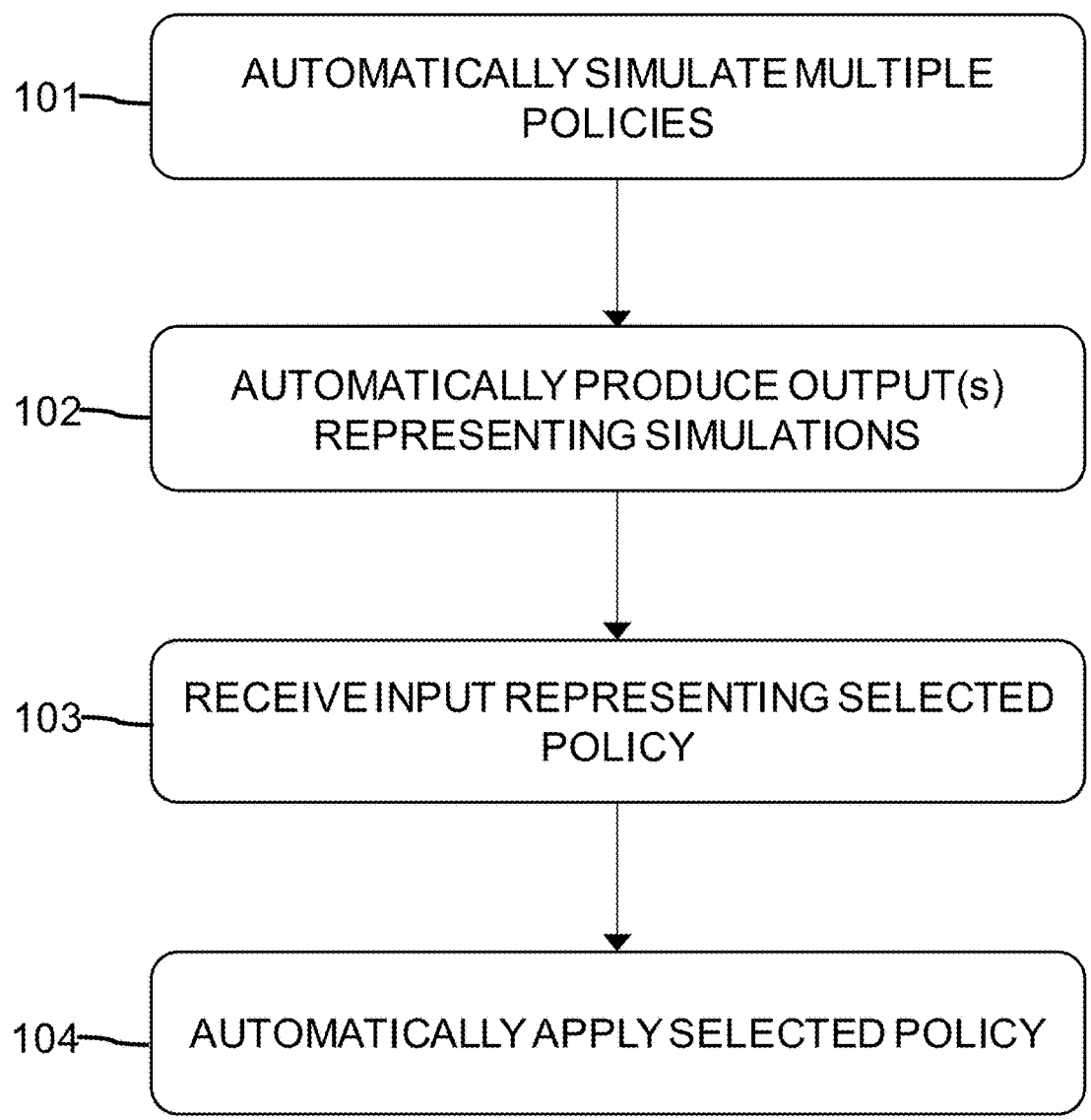
FIG. 1 is a flowchart of a method for policy selection.

Referring to FIG. 1, a computer-implemented method 10 is configured to implement an optimal policy for a decision-making scenario. In some examples, the method provides a computer-implemented framework for running policy simulations on a wide range of problems encountered in decision-making scenarios. In general, a "policy" in Reinforcement Learning is a mapping from states to actions. It defines the agent's behavior, telling it what action to take in any given state. For example, in the context of a time-series dataset, policy simulations play a role in assessing the effects of policies on user-specified metrics. This information serves multiple purposes, including the selection of optimal policies, conducting sensitivity analyses, and facilitating the automation of decision-making processes. By systematically evaluating the impact of different policies on relevant metrics, decision-makers can make informed choices and enhance the efficiency of their operations.

The technology can be applied to many contexts, such as retail purchase order generation, electric grid generator control, and schedule planning in domains such as retail, hospitals, and factories. For purposes of discussion and illustration only, the retail purchase order generation context is used herein as a concrete example. It is understood that the discussion and disclosure apply to other contexts.

Internally, the technology has several components that interact with each other. There is an environment that is learned from the data. As an example, in the retail context this environment would be used to query sales for a particular day for a particular stock-keeping unit (SKU) and beliefs/assumptions/predictions about what will be sold in the future. The state tells us the current state of the world during our simulations.

For example, in the retail purchase order generation context, the state tells us how much inventory exists for a particular SKU at a particular time and any incoming units in the order queue. The dynamics tells us how these pieces (e.g., environment and state) interact to determine the next state. For example, current inventory−sales+incoming orders=inventory for the next day. The technology can determine various metrics that can be user-specified and that the user can use to determine or select the optimal policy. After the optimal policy is selected, the optimal policy interacts with these components to specify some decision maker's (e.g., computer's) actions, which can be performed automatically. So internally during the exploratory phase, a simulation is performed over each day and query the environment for each SKU. What is sold on a given day and what beliefs about the future are then known. This information is compared to the current state (current inventory and orders in queue) and applied the selected/optimal policy to automatically make some decision about how much to order in the next purchase order.

Each day, user-specified metrics are tracked. These can include total dollars in inventory, missed sales (calculated from cases when demand exists but no inventory is available), total number of orders places, and/or other metrics (e.g., as discussed herein).

Figure 2:
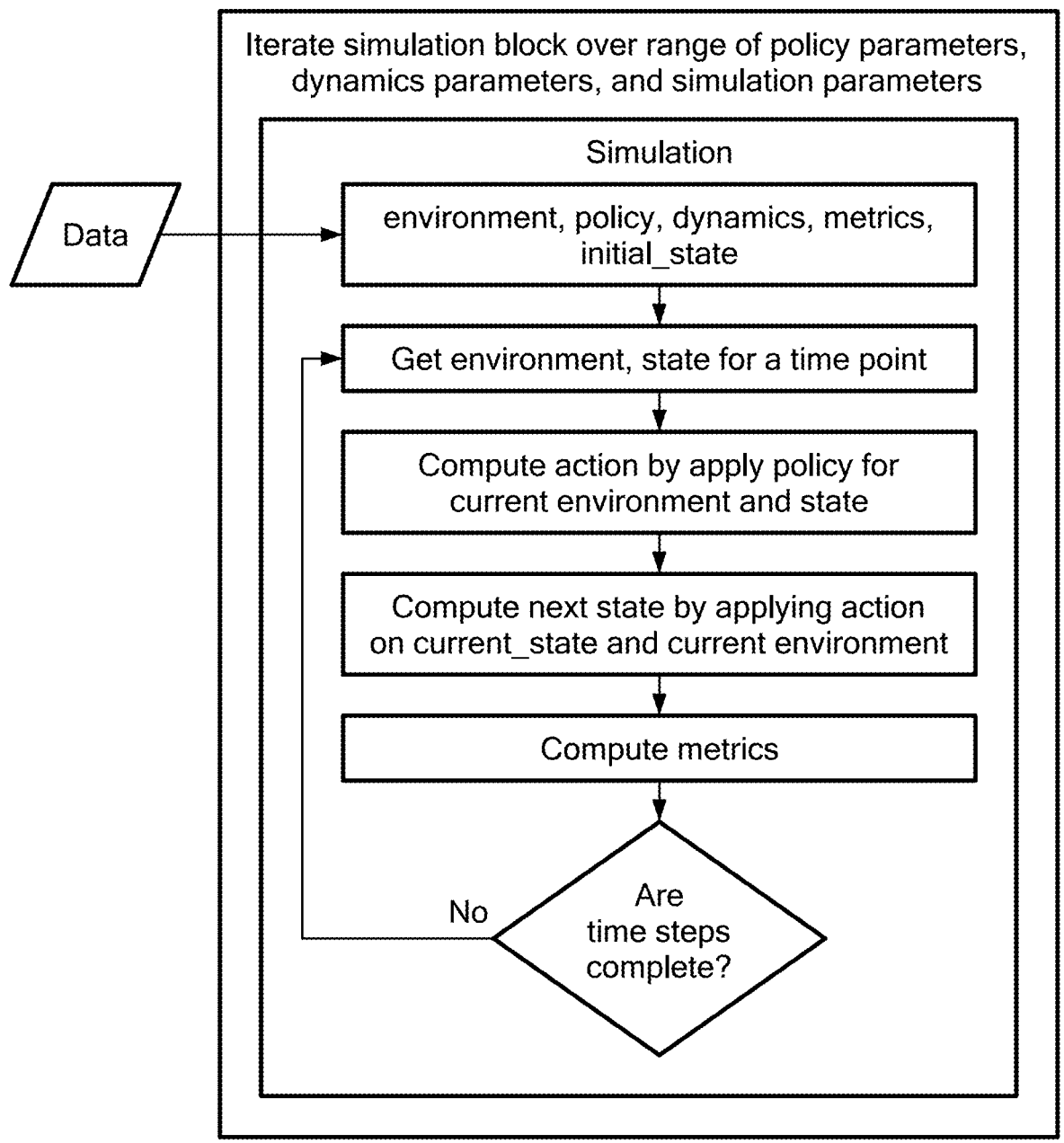
FIG. 2 is a flowchart of a method for simulation of policies.

In step 101, multiple policies are automatically simulated. The policies can be simulated over a range of policy parameters, dynamics parameters, and/or simulation parameters, which can be set by a user. Each policy can be simulated using flow chart 20 illustrated in FIG. 2.

In flow chart 20, the simulation is automatically run for a defined number of time steps and the metrics are automatically computed for each run of the simulation. The optimal policy can be chosen by the metrics that are best suited for the specific simulation.

One simple policy in the retail purchase order generation context could be the following: order 5 days of inventory if the store has less than 3 days of inventory left and there are no orders in the pipeline. A simulation using this policy over three days, on a store that only sells hammers, could look like the following:

Day 1
  Current_state={hammer_inventory: 20, hammer_orders: [0,0,0]}
    I.e. day 1 begins with 20 hammers and no orders in the queue
    The queue is length 3, meaning it takes 3 days for a placed order to arrive at the store.
  Current_environment={hammer_sales: 7, hammer_price $9.99, future_predictions: [5, 4, 3, 7, 2]}
    I.e. the hammer sales for day 1 will be 7 units, the hammer sells for $9.99, the future_predictions are what our predictions for sales will be for the next 5 days
    The future_predictions can be based off historical sales data from the store and/or from other stores (e.g., if the store is part of a chain)
  Action={hammers: 0}
    I.e. the policy was applied and the policy prescribed an order of 0 units
    The policy says if there are less than 3 days of inventory, place an order
    3 days of inventory is the sum of the first 3 values in future_predictions: 5+4+3=12
    Since the current inventory (20) is not less than 3 days of inventory (12), no order is placed
  Next_state={hammer_inventory: 13, hammer_orders: [0,0,0]}
    The inventory for the next time step is max (current_inv−sales+incoming orders, 0)
    Current_inv=20, sales=7, incoming_orders=0 (leftmost entry in hammer_orders list at the beginning of current time step)
    The hammer_orders appears to look the same for current and next state but the leftmost entry was actually removed (the order arriving at the current time step) [0,0,0]→[0,0], then appended the new order to the right [0,0]→[0,0,0]
  Metrics={inventory: 199.80, missed_sales: 0}
    I.e. the inventory was 20 units*9.99 per unit
    The metrics can be calculated based on the inventory at the start of the day (20 units) and/or the at the end of the day (13 units)
    No sales were lost because there was enough inventory to meet demand
Day 2
  Current_state: {hammer_inventory: 13, hammer_orders: [0,0,0]}
    I.e. current state for time t is next_state for t−1
  Current_environment={hammer_sales: 10, hammer_price 9.99, future_predictions: [4, 3, 7, 2, 8]}
    It is noted that the actual hammer sales on a given day can be the same as or different than the predicted hammer sales
  Action={hammers: 24}
    I.e. the policy was applied and the policy prescribed an order of 24 units
    The policy says if there are less than 3 days of inventory, place an order
    Inv=13
    3 days of inventory is the sum of the first 3 values in future_predictions is 4+3+7=14
    Since the inventory (13) is less than 3 days of inventory (14), an order is placed The order is for our expected sales for the next 5 days (the 5 is a policy parameter)

The order is then 4+3+7+2+8=24

Next_state={hammer_inventory: 3, hammer_orders: [0,0,24]}

The inventory for the next time step is max (current_inv−sales+incoming orders, 0)

Current_inv=13, sales=10, incoming_orders=0 (leftmost entry in hammer_orders list at the beginning of current time step) . . . .

The order is added to the end of the queue, meaning it will arrive in 3 days

Metrics={inventory: 129.87, missed_sales: 0}

I.e. the inventory was 13 units*9.99 per unit

No sales were lost because there was enough inventory to meet demand

Day 3

Current_state: {hammer_inventory: 3, hammer_orders: [0,0,24]}

I.e. current state for time t is next_state for t−1

Current_environment={hammer_sales: 7, hammer_price 9.99, future_predictions: [3, 7, 2, 8, 9]}

Action={hammers: 0}

I.e. the policy was applied and the policy prescribed an order of 0 units

Even though our inventory is sufficiently low for an order to be placed, there is already an order in the queue so no order is placed Next_state={hammer_inventory: 0, hammer_orders: [0, 24, 0]}

The inventory for the next time step is max (current_inv−sales+incoming orders, 0)

Current_inv=3, sales=7, incoming_orders=0 (left most entry in hammer_orders list at the beginning of current time step)

The order is added to the end of the queue, meaning it will arrive in 3 days

Metrics={inventory: 0, missed_sales: 39.96}

I.e. the inventory was 0 units*9.99 per unit

There were 3 units in stock and 7 units of demand (these 7 units are real historical sales at the retailer). So the missed sales were 7−3=4 units. Each unit goes for 9.99 so the missed sales were $39.96

Referring to FIG. 3, the above simulation is represented as a table by days. Thus, it can be seen in the above example that the present policy can lead to a stockout and missed sales. The metrics tracked in this example are inventory and missed sales.

Another policy might be to order 4 days of inventory when the store has less than 2 days of inventory left. This policy could be simulated and the metrics such as missed_sales and inventory tracked. If there is interest in avoiding any stockouts, a policy that prevents that would be preferred. In general, a business policy would be an optimization for a combination of objectives which could be represented as an objective function appropriately combining all the metrics of interest. Some of the metrics that could be tracked in the retail case can include Stock Levels, Inventory Turnover, Days Sales of Inventory (DSI), Average number of days items stay in inventory before being sold, Open orders, Backorders, Canceled orders, Order Lead Time, Stockouts, Duration of stockouts, and/or Carrying Cost of Inventory. The metrics for other contexts will be apparent to those of skill in the art.

As can be seen, the range of policies can be extremely large, particularly in an environment with millions of products. With this technology, the optimal policy can be learned without brute forcing through a large range of policy, dynamics, simulation parameters, and the associated metrics calculations. Referring to FIG. 4, an example of pseudocode to automatically simulate a policy is provided.

Returning to FIG. 1, after the policies are automatically simulated in step 101, one or more outputs representing the simulations is/are automatically produced in step 102. The output(s) can represent the metrics of interest for one or more policies. The output(s) can be provided in a table (e.g., similar to the table of FIG. 3), in a graph, and/or in another form. The output(s) can be provided with visual cues that can indicate how the metrics relate to the policies and/or how the metrics relate to each other. For example, the metrics can be color-coded or can include symbols that can indicate which policies the metrics represent. In addition, or in the alternative, the metrics can be color-coded to indicate which metrics are relatively high (e.g., green) and which metrics are relatively low (e.g., red), such as in a heat map. In some embodiments, the output(s) can be produced as a dashboard.

Figure 5:
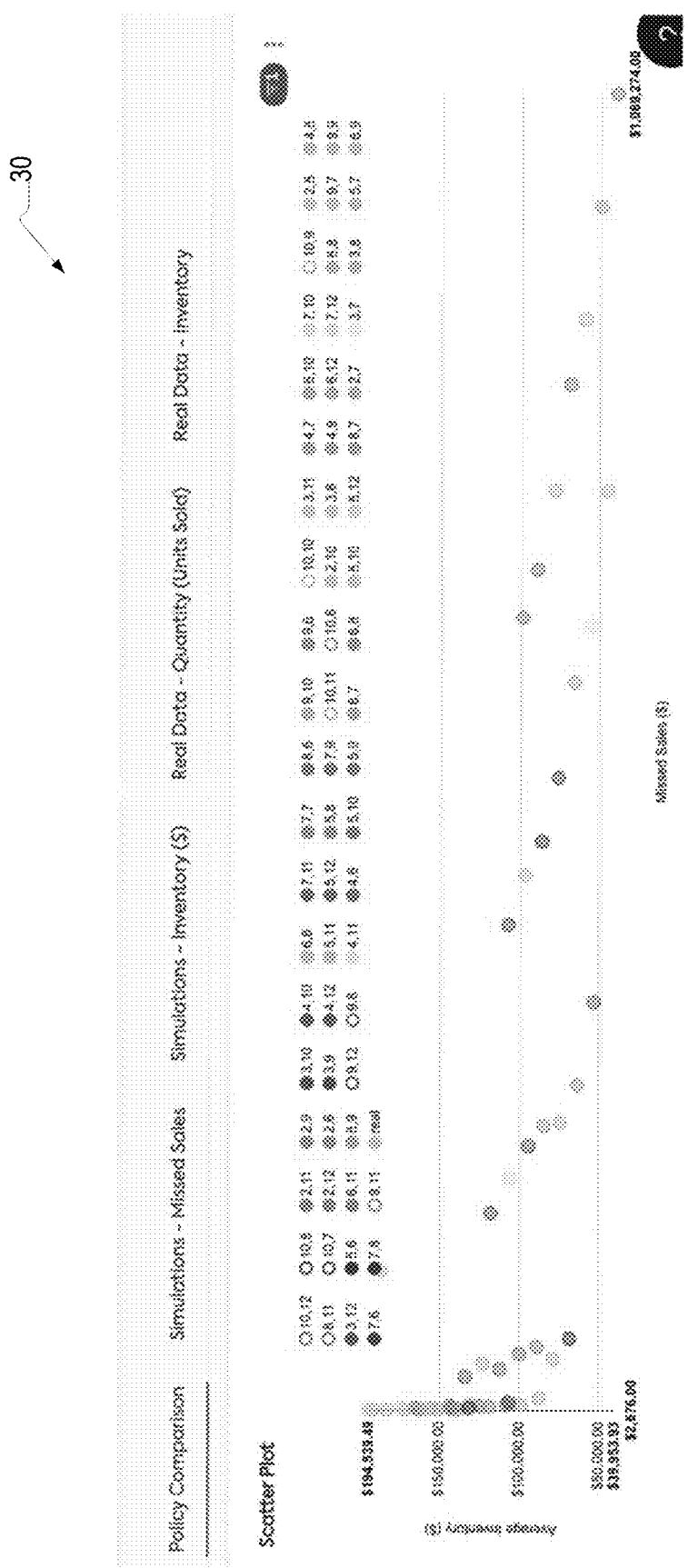
FIG. 5 is a scatter plot of policies relative to metrics.

An example of a graphical output 30 that can be produced in step 102 is illustrated in FIG. 5. Graphical output 30 is a scatter plot of missed sales versus average inventory for each policy, which is indicated by color in the key above the scatter plot. This scatter plot can provide an easy and/or intuitive way for a user to analyze a large data set such as for trade-offs.

Returning to FIG. 1, in step 103, the user selects a policy (e.g., a selected or optimal policy) which is received as an input by the computer. In step 104, the computer automatically applies the selected/optimal policy. Applying the selected/optimal policy can include automatically evaluating current sales data, current inventory data, expected sales data, and order data to automatically perform an action, such as ordering (or not ordering) additional products. For example, using the hammer example above, the computer can implement the policy by automatically ordering hammers (as opposed to simulating ordering hammers) when the current inventory of hammers is below the limit set by the selected/optimal policy.

Steps 101 and 102 can optionally be referred to as an "exploratory" mode. Steps 103 and 104 can optionally be referred to as a "deployment" mode. The exploratory mode is used to run simulations and get a dataset with times series results for each policy. The results of exploratory mode can be used to select the selected/optimal policy which is then applied in deployment mode to actually make automated decisions about the future (e.g. create purchase orders) using the selected/optimal policy. Referring to FIG. 6, an example of pseudo-code to automatically apply a selected/optimal policy is provided.

Aspects of the technology exhibit similarities to conventional reinforcement learning. In typical reinforcement learning scenarios, a policy is learned to maximize a cumulative reward function. Nevertheless, in real-world applications, constructing such a cumulative reward function becomes challenging due to the existence of multiple, often conflicting, evaluation metrics. Consequently, optimizing for one metric may result in a detrimental impact on another. To address this, a multivariable objective function can be employed, allowing for the monitoring of performance across a diverse set of policies and metrics. The technology can identify the Pareto boundary, enabling intuitive analysis of trade-offs.

The entire process, spanning from running exploratory policy simulations to creating informative dashboards that can illustrate Pareto boundaries, culminating in the selection and deployment of a specific policy for decision-making, is seamlessly achievable with the technology.

As can be seen, the technology exhibits versatile applicability, extending to various use cases where decision-makers face the responsibility of making present decisions with future implications. Potential scenarios encompass retail purchase order generation, electric grid generator control, and schedule planning in domains like retail, hospitals, or factories. Additional scenarios and applications will be apparent to those of skill in the art.

In these contexts, the technology's capabilities can effectively support decision-makers in navigating complex decision landscapes and identifying optimal policies that strike a balance between multiple metrics, considering trade-offs and long-term consequences. Whether it involves optimizing inventory management, ensuring efficient electricity distribution, or streamlining operational schedules, the technology's ability to handle multivariable objective functions can prove invaluable for enhancing decision-making processes in diverse industries.

Figure 7:
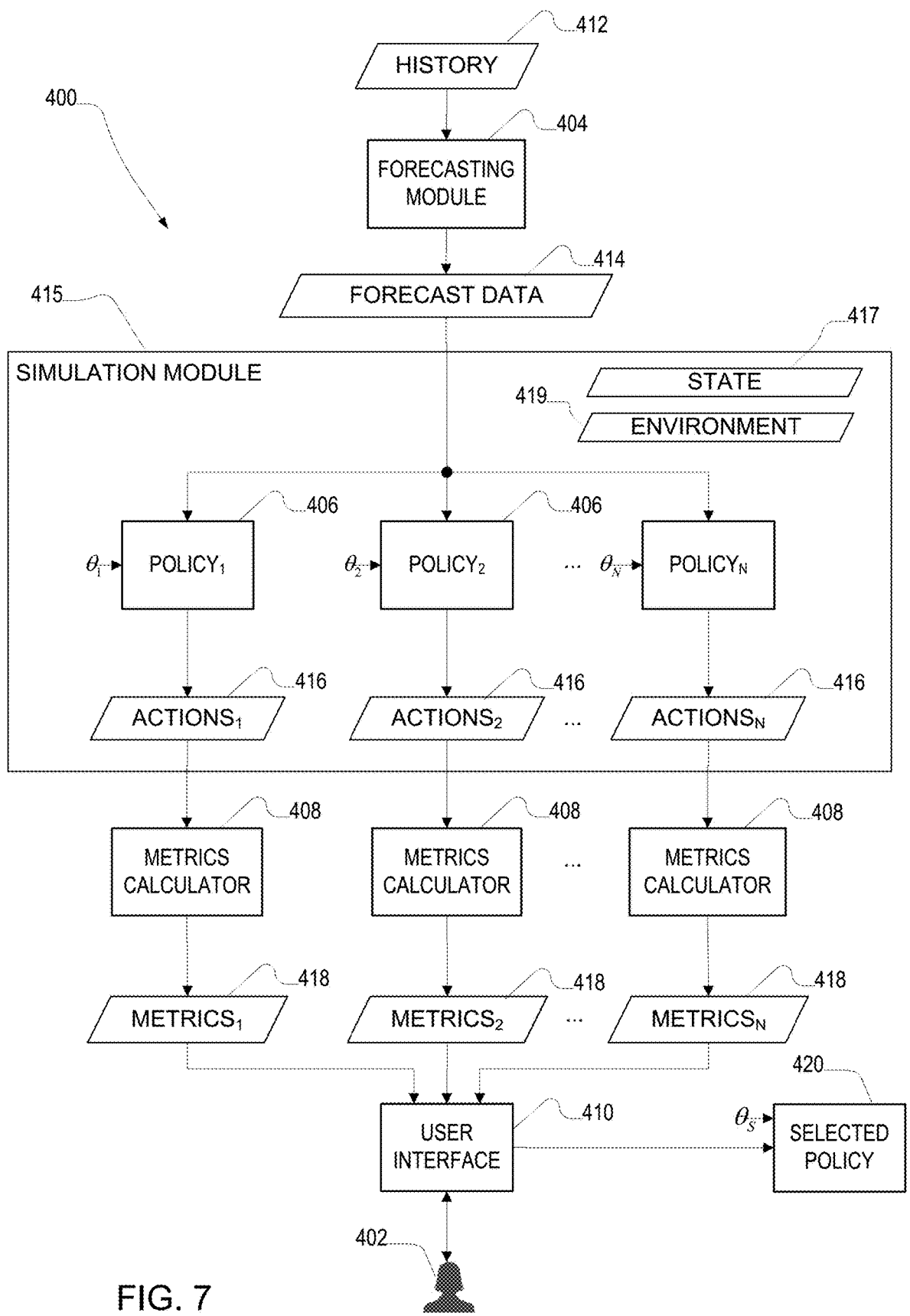
FIG. 7 is a schematic block diagram of a system for exploring policies.

Referring to FIG. 7, in another example, a policy exploration system 400 allows user 402 to explore the effects of different policies on metrics that are relevant to the user and to select a policy for use in a deployed system based on their exploration. In one example, the policy exploration system 400 presents the relevant metrics for each policy alongside a Pareto tradeoff curve for the relevant metrics. The user 402 can use the presentation of the policies and Pareto tradeoff curve to select a policy with metrics that align with their business objectives.

The system 400 includes a forecasting module 404, a simulation module 415, N parameterized policies 406, N metric computation modules 408, and a user interface 410. The forecasting module 404 receives history data 412 and processes the history data 412 to generate forecast data 414 (e.g., a predicted series of future events such as future daily sales) based on the history data. For example, the history data 412 could include hammer sales for each day of the previous month, and the forecasting module 404 could generate forecast data including predicted daily hammer sales for the next five days (as in the examples above) based on the history data 412. In one example, the forecasting module 404 is implemented using the techniques described in U.S. patent application Ser. No. 18/649,002, the entire contents of which are incorporated herein by reference.

The forecast data 414 is provided to the simulation module 415, which simulates the application of the N parameterized policies 406 based on the forecast data to generate a set of actions 416 for each of the policies 406 (i.e., ACTIONS$_1$ . . . . ACTIONS$_N$), as described above (e.g., ACTIONS$_1$={"order 0 hammers," "order 24 hammers," "order 0 hammers" . . . }).

The simulation module 415 maintains a simulation state 417 (e.g., hammer_inventory and hammer_orders) and a simulation environment 419 (e.g., hammer_sales, hammer_price, and future predictions from the forecast data) for each of the N parameterized policies 406. The simulation state 417 and the simulation environment 419 are initialized with initial conditions.

Each policy of the N parameterized policies 406 is initialized with a different set of parameters. One example of a parameterized policy is described above as an inventory ordering policy of: order x days of inventory when the store has less than y days of inventory left. In that example, the number of days of inventory to order (x) and the number of days of inventory left (y) are the parameters for the policy. In one example, the parameters for the N policies 406 are chosen using a grid search technique or any other technique suitable for probing the parameter space to reveal the Pareto tradeoff curve for metrics relevant to the user.

The simulation module 415 simulates the application of the N parameterized policies 406 by repeatedly applying the policies based on the current simulation state 417 and simulation environment 419 for each policy (updating the state and environment as it goes). Ultimately, the simulation module 415 generates the set of actions 416 for each of the policies. Each set of actions 416 is then processed in a metric calculation module 408, which generates a set of two or more metrics 418 for the policy (e.g., Average Inventory ($) and Missed Sales ($)). While not shown in the figure, the metric calculation modules 408 may also use other information such as the forecast data 414, the simulation state 417, and the simulation environment 419 to generate the metrics 418.

Figure 8:
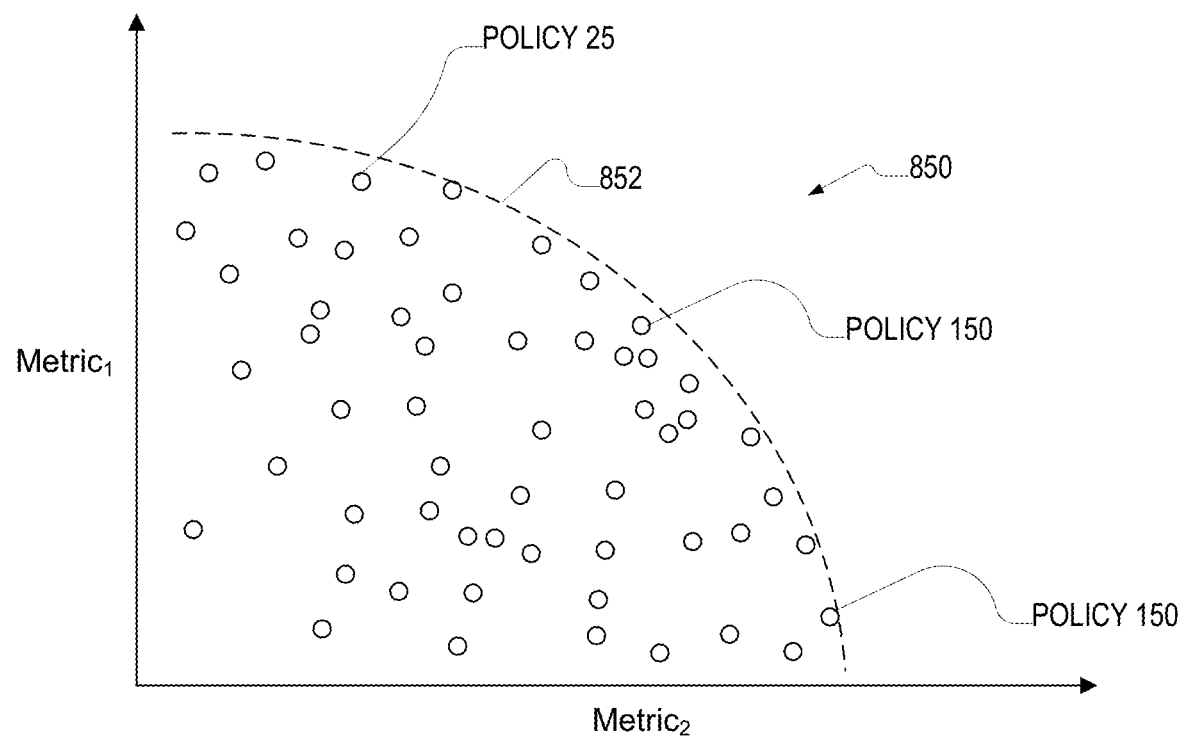
FIG. 8 is another scatter plot including a Pareto boundary.

Each set of metrics 418 is provided to a user interface module 410, which presents the metrics for each policy to the user 402. In some examples, the user interface module 410 also processes the metrics to generate a Pareto tradeoff curve for the metrics, which is shown to the user alongside the metrics for the N policies. For example, referring to FIG. 8, the N policies are represented as dots in a scatter plot 850 where the y-axis of the scatter plot is a first metric ("Metric$_1$") and the x-axis of the scatter plot is a second metric ("Metric$_2$"). A Pareto tradeoff curve 852 represents the boundary where improving one of the metrics would result in worsening of the other of the metrics. In some examples, the Pareto tradeoff curve is determined using a grid search technique. In other examples, different techniques are used to discover the Pareto tradeoff curve. For example, the weighted sum method, genetic algorithms, multi-objective particle swarm optimization, simulated annealing, adaptive grid search, or any other suitable technique could be used.

In some examples, the scatter plot 850 is presented to the user 402 through the user interface 402, and the user selects a policy based on their business objectives. For example, if Metric$_1$ were "Average Inventory ($)" and Metric$_2$ were "Missed Sales ($)," and the user wanted to prioritize the reduction of missed sales, the user might choose "Policy 25" based on its location in the scatter plot 850 relative to the Pareto curve 852. Alternatively, if the user wanted to balance the two metrics, they might choose policy 150 based on its location in the scatter plot relative to the Pareto curve 852. Referring again to FIG. 4, The policy selected by the user 402 is output from the system 400 as the selected policy 420.

Figure 9:
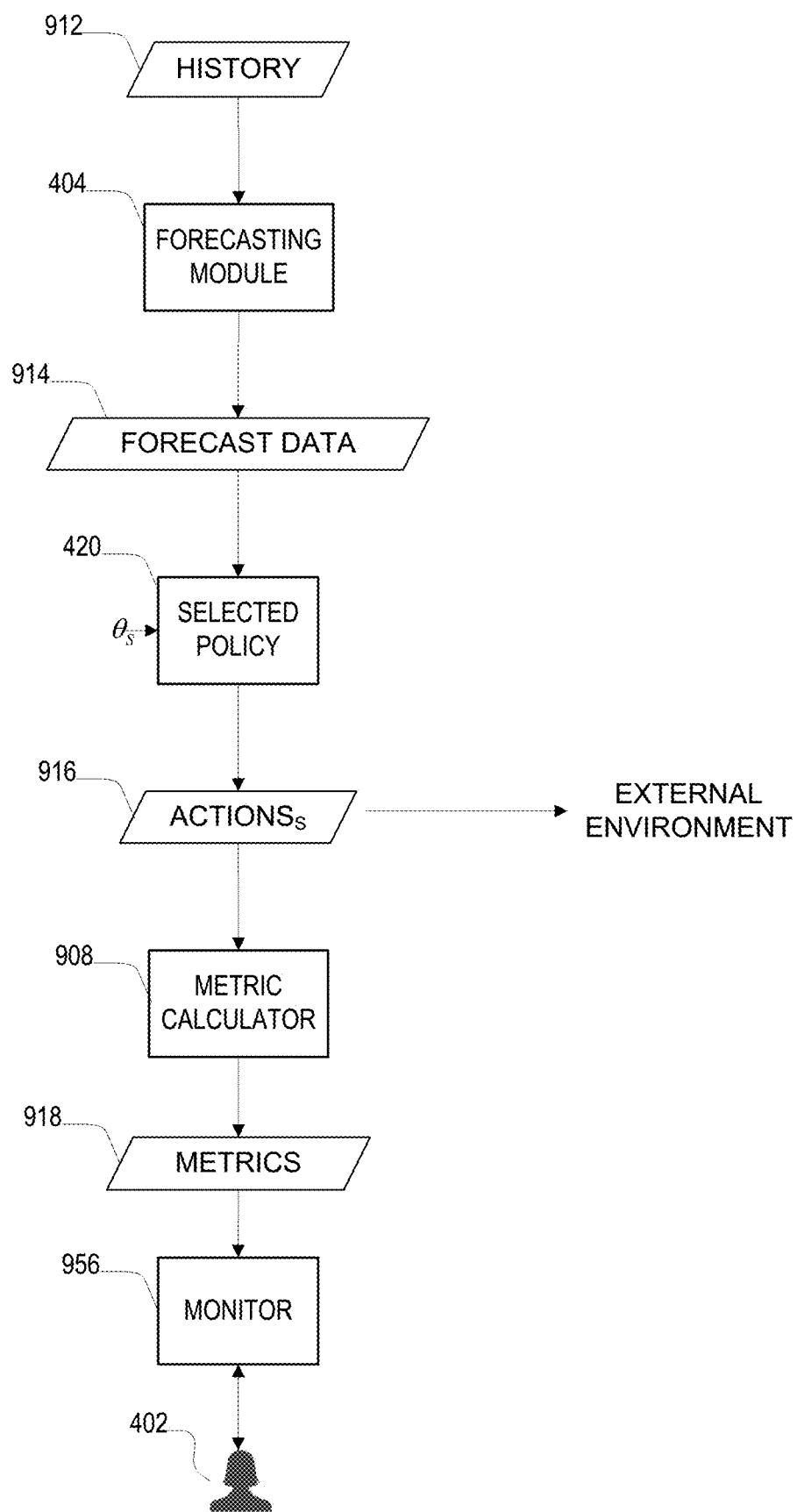
FIG. 9 is a schematic block diagram of a system for applying a policy at runtime.

Referring to FIG. 9, at deployment time the forecasting module 404 is used to process the history 612 (e.g., the sales history for hammers up to the current date) to generate forecast data 614 as described above. The selected policy 420 is applied to the forecast data 614 to determine action(s) 916 to take (e.g., order 24 hammers). In the deployed case, the actions may be executed by interacting with an external environment rather than simulating actions (e.g., by automatically generating and/or issuing a purchase order).

In some examples, a metric calculation module 908 processes the action(s) (or a stored series of the actions) to determine current metrics 918 for the selected 420 policy. The metrics 918 are provided to a monitor 956 which notifies the user 402 if the metrics have drifted such that the policy needs to be updated (e.g., due to changes in sales patterns). The user 402 may act on the notification by re-doing the policy exploration method described above to identify a new policy with metrics that better meet the user's business objectives.

The technology can be implemented on a computer and/or in a client-server architecture. Other implementations are possible and will be apparent to those of skill in the art.

This disclosure should not be considered limited to the particular embodiments described above. Various modifications, equivalent processes, as well as numerous structures to which the present technology may be applicable, will be readily apparent to those skilled in the art to which the technology is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in field programmable gate arrays (FPGAs) or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a personal digital assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, an intelligent network, or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of the present application need not reside on a single computer or processor but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the present disclosure includes new and novel improvements to existing methods and technologies, which were not previously known nor implemented to achieve the useful results described above. Users of the present method and system will reap tangible benefits from the functions now made possible on account of the specific modifications described herein causing the effects in the system and its outputs to its users. It is expected that significantly improved operations can be achieved upon implementation of the technology.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A method for selecting a policy, the method comprising:
    evaluating a plurality of metrics for each policy of a plurality of policies including generating, for each policy of a first plurality of policies, values of said metrics, the generating including applying said policy to a system to generate said values;
    processing the values of the plurality of metrics for the first plurality of policies to identify a second plurality of policies, as a subset of the first plurality of policies excluding at least some policies of the first plurality of policies, such that the second plurality of policies determines a boundary in a space of the processed metric values, combinations of metric values in said space on said boundary, including at least a Pareto boundary, representing respective policies of the second plurality of policies such that for each policy of the second plurality of policies, no other policy of the first plurality of policies improves all the metric values of the each policy of the second plurality of policies;

presenting, in a user interface, the boundary comprising a combination of metric values for each respective policy of the second plurality of policies;

receiving, at the user interface, a selection of one of the policies of the second plurality of policies made based on the boundary; and providing configuration data associated with the selected policy for implementation in a deployed system.

2. The method of claim 1 further comprising presenting, in the user interface, combinations of metric values for each policy of the second plurality of policies.

3. The method of claim 1 wherein generating the values of the metrics is based at least in part on a history of operation of the system.

4. The method of claim 3 wherein generating the values of the metrics includes simulating the application of the plurality of policies to the system based on the history of operation of the system.

5. The method of claim 3 wherein generating the values of the metrics based at least in part on the history of operation of the system includes using the history to predict future operation of the system.

6. A method for selecting a policy, the method comprising:

evaluating a plurality of metrics for a plurality of policies including generating, for each policy of a plurality of policies, values of said metrics, the generating including applying said policy to a system to generate said values;

processing the values of the metrics for the plurality of policies to determine a boundary in a space of the processed metric values, combinations of metric values, combinations of metric values in sa ace on said boundary representing a respective policy of the plurality of policies such that no other policy of the plurality of policies improves all the metric values of the respective policy of the plurality of policies;

receiving, at the user interface, a selection of one of the policies made based on the boundary; and providing configuration data associated with the selected policy for implementation in a deployed system;

wherein the boundary of combinations is a Pareto boundary.

7. The method of claim 1 wherein each policy of the plurality of policies is a decision-making policy.

8. The method of claim 1 wherein the boundary is presented as a curve in a cartesian coordinate system.

9. The method of claim 1 wherein the boundary is presented as a surface in a three-dimensional coordinate system.

10. The method of claim 1 wherein each policy of the pluralities of policies includes a mapping of states of the system to actions to be taken by the system.

11. The method of claim 10 wherein evaluating the plurality of metrics for the plurality of policies includes determining a set of actions to be taken by the system for each policy of the plurality of policies.

12. The method of claim 11 wherein the values of the metrics for the policies are based at least in part on the set of actions associated with the policies.

13. The method of claim 1 further comprising receiving an indication from the deployed system that the values of the metrics associated with the selected policy have changed and a new policy should be selected.

14. A system for selecting a policy, the system comprising:

one or more hardware processors configured to:
evaluate a plurality of metrics for each policy of a plurality of policies including generating, for each policy of a first plurality of policies, values of said metrics, the generating including applying said policy to a system to generate said values; and process the values of the plurality of metrics for the plurality of policies to identify a second plurality of policies, as a subset of the first plurality of policies excluding at least some policies of the first plurality of policies, such that the second plurality of policies determines a boundary in a space of the processed metric values, combinations of metric values in said space on said boundary, including at least a Pareto boundary, representing respective policies of the second plurality of policies such that for each policy of the second plurality of policies, no other policy of the first plurality of policies improves all the metric values of the each policy of the second plurality of policies;

a user interface configured to:
present the boundary comprising a combination of metric values for each respective policy of the second plurality of policies; and
receive a selection of one of the policies of the second plurality of policies made based on the boundary; and an output for providing configuration data associated with the selected policy for implementation in a deployed system.

15. Software stored on a non-transitory, computer-readable medium and including instructions for causing a computing system to implement a method for selecting a policy, including causing the computing system to:

evaluate a plurality of metrics for each policy of a plurality of policies including generating, for each policy of a first plurality of policies, values of said metrics, the generating including applying said policy to a system to generate said values;

process the values of the metrics for the plurality of policies to identify a second plurality of policies, as a subset of the first plurality of policies excluding at least some policies of the first plurality of policies, such that the second plurality of policies determines a boundary in a space of the processed metric values, combinations of metric values in said space on said boundary, including at least a Pareto boundary, representing respective policies of the second plurality of policies such that for each policy of the second plurality of policies, no other policy of the first plurality of policies improves all the metric values of the each policy of the second plurality of policies;

present, in a user interface, the boundary comprising a combination of metric values for each respective policy of the second plurality of policies;

receive, at the user interface, a selection of one of the policies of the second plurality of policies made based on the boundary; and provide configuration data associated with the selected policy for implementation in a deployed system.

* * * * *